United States Patent
Inomata et al.

(10) Patent No.: US 7,372,963 B2
(45) Date of Patent: May 13, 2008

(54) DEVICE FOR COMPRESSION AND ENCRYPTION, AND DEVICE FOR DECOMPRESSION AND DECRYPTION

(75) Inventors: Kohshiro Inomata, Shinjuku-ku (JP); Katsuya Mitsutake, Shinjuku-ku (JP)

(73) Assignee: Fuji Xerox Co., Ltd., Tokyo (JP)

( * ) Notice: Subject to any disclaimer, the term of this patent is extended or adjusted under 35 U.S.C. 154(b) by 758 days.

(21) Appl. No.: 10/624,681

(22) Filed: Jul. 23, 2003

(65) Prior Publication Data
US 2004/0120517 A1 Jun. 24, 2004

(30) Foreign Application Priority Data
Dec. 19, 2002 (JP) .............................. 2002-367671

(51) Int. Cl.
*H04K 1/00* (2006.01)
*H04L 9/00* (2006.01)
*H04N 5/85* (2006.01)

(52) U.S. Cl. ..................... 380/271; 380/28; 380/30; 380/277

(58) Field of Classification Search ............... 380/271, 380/28, 30, 277
See application file for complete search history.

(56) References Cited

U.S. PATENT DOCUMENTS 4,700,175 A * 10/1987 Bledsoe ..................... 341/65
6,122,379 A * 9/2000 Barbir ...................... 380/269

FOREIGN PATENT DOCUMENTS

| JP | 04294684 A | * 10/1992 |
| JP | A 6-125553 | 5/1994 |
| JP | A 2000-115551 | 4/2000 |
| JP | A 2002-190798 | 7/2002 |

OTHER PUBLICATIONS

Mats Brorsson, Mikael Collin, "Compilation: Adaptive and Flexible Dictionary Code Compression for Embedded Applications", Oct. 2006, Proceedings of the 2006 international conference on compliers, architecture, and synthesis for embedded systems CASES '06, pp. 113-124.*

English Translation for JP 04294684 A has been submitted on Dec. 20, 2007, pp. 1-30.*

* cited by examiner

*Primary Examiner*—Matthew Smithers
*Assistant Examiner*—Courtney D Fields
(74) *Attorney, Agent, or Firm*—Oliff & Berridge, PLC (57) ABSTRACT

To reduce processing load or processing time required for compression and encryption of data. Data to be compressed, such as image data, is divided into specified block sizes by am image divider (10). A quantizer (12) references a quantization table (14) to quantize each of these blocks of data. The result of this quantization is entropy encoded by an entropy encoder (16) referencing a coding table (18) to acquire compressed data. An encryptor (20) encrypts the quantization table (14) and coding table (18) used in the quantization and encoding using a specified encryption method. A multiplexor (24) gathers together the encrypted data acquired as a result together with the compressed data in a specified format.

15 Claims, 7 Drawing Sheets

DEVICE FOR COMPRESSION AND ENCRYPTION, AND DEVICE FOR DECOMPRESSION AND DECRYPTION

BACKGROUND OF THE INVENTION

1. Technical Field

The present invention relates to a compression/encryption device for carrying out data compression and a decompression/decryption device corresponding to the compression/encryption device.

2. Related Art

Recently, the use of image data has become more and more common with the spread of digital cameras and scanned electronic documentation. There has also been a trend towards high definition image data, as a result of which the data size for a single image has tended to increase.

On the other hand, with image data there is an accompanying risk of data disclosure due to interception on the internet or as a result of being viewed by unauthorized persons. In order to deal with this type of problem, a method of encrypting image data is effective. For example, if encryption is carried out using an en encryption method such as triple DES or AES, data integrity is considered to be protected.

However, there is a problem that the amount of processing expended by these safe encryption methods results in a significantly increased processing time (or CPU load) in proportion to the data size. The same is true for decryption methods. It also goes without saying that as the number of data items increases, the processing time is increased in proportion.

Addressing this type of problem, for example, Japanese Patent Laid-open No.2000-115551 discloses an encryption method that reduces the amount of processing involved in encryption by dividing a single image into a plurality of blocks, encrypting only some blocks, and computing a difference from the encrypted blocks for the remaining blocks.

Also, Japanese Patent Laid-open No. Hei. 6-125553 discloses an encryption method that reduces the amount of processing involved in encryption by only encrypting a direct current component when carrying out DCT (Discrete Cosine Transform) transformation on the image data.

Further, Japanese Patent Laid-open No. 2002-190798 discloses an encryption method that reduces the overall processing load involved in encryption by carrying out encryption using strong encryption means for parts of the data having high importance based on predetermined analysis rules, and then carrying out weak encryption processing on other sections of the data.

However, the method disclosed in Japanese Patent Laid-open No.2000-115551 only carries out reliable encryption processing on part of the image data to be encrypted, while it is also necessary to compute a difference between remaining portions and the encrypted portions, which means that for a large amount of data the overall processing amount will not always decrease.

Moreover, with the method disclosed in Japanese Patent Laid-open No. Hei 6-125553, since a dc component occupies a constant amount of the overall data (normally $\frac{1}{64}$), there is a problem that the amount of processing involved in encryption is also increased in proportion to the data size.

Further, since the method disclosed in Japanese Patent Laid-open No. 2002-190798 can only be applied to data that is defined as a predetermined priority in each section of the image, there is a problem that the data the method can be applied to is limited.

As can be seen, in the related art, there is a problem in that the processing load (or processing time) for the amount of processing expended on encryption processing increases as the data size increases, and that for unknown formats there is no effect.

Encryption of image data has been given above by way of example, but the same problems also apply to data other than image data.

SUMMARY OF THE INVENTION

With the present invention, attention has been paid to the point that particular types of compression encoding method, such as huffman encoding, or JPEG or MPEG, use a table storing necessary parameters for data compression processing such as a coding table or a quantization table, and the information for that table is collected together in a single file together with the compressed data. That is, with the present invention, instead of encrypting data that is desired to be compressed and encrypted (hereinafter called data to be compressed), a reference table for data transformation used at the time of that data compression is encrypted.

DESCRIPTION OF THE PREFERRED EMBODIMENTS

Preferred embodiments of the present invention will be described in the following with reference to the drawings. In the following description, description will be given with the case of compression and encryption of image data as a main example, but the present invention is obviously also applicable to the case of handling data other than image data.

Figure 1:
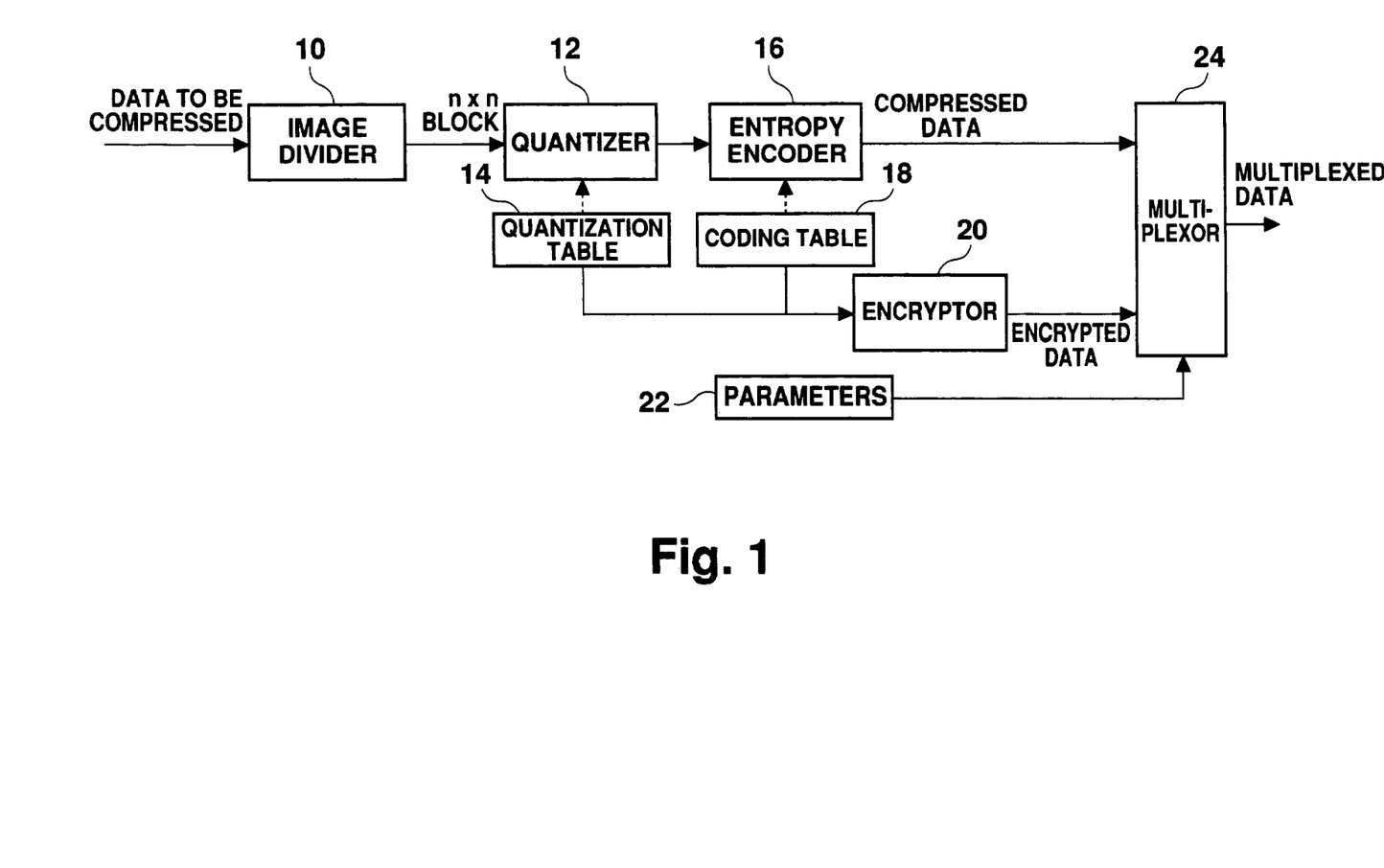
FIG. 1 is a functional block diagram showing the structure of a compression/encryption device of the present invention.

FIG. 1 is a functional block diagram showing the structure of a compression/encryption device of the present invention. The exemplified device is a device for compressing and encrypting image data.

An image divider 10 divides original data to be compressed (image data in this case) into block units made up of pixel data of n pixels×n pixels. For example, in the case of JPEG compression, n=8. Data for each divided block is converted into a set of n×n frequency components (not shown in the drawing) by specified two-dimensional orthogonal transformation processing. For example, in the case of JPEG compression, DCT (Discrete Cosine Transform) processing is carried out as the orthogonal transformation processing. It is also possible to use a wavelet transform as the orthogonal transformation processing. The set of n×n frequency components is input to a quantizer 12.

The quantizer 12 quantizes values of each of the input n×n frequency components based on a quantization table 14. The quantization table 14 is a table containing n×n quantization thresholds, and individual table entries (that is, quantization thresholds) are set in advance before quantization processing. It is possible to use only a single quantization table 14 for all blocks of the data to be compressed, as the quantization table 14, or to use a plurality of quantization tables 14 and to change the quantization table 14 for each of the plurality of blocks. Quantization processing carried out by referring to the quantization table 14 can be general processing being carried out with JPEG compression etc. For example, as the quantization processing it is possible to have processing where, if values of the frequency components (u,v) (u and v are integers in the range 0—(n−1)) are made S_uv, and thresholds corresponding to these frequency components in the quantization table 14 are set to Q_uv, the equation defined by the following equation is applied to all of the n×n data items and output data r_uv is obtained.

$$r\_uv = \text{round}(S\_uv/Q\_uv)$$

Here, "round" means rounding up or down to the closest integer.

This quantization processing is irreversible, but it is possible to significantly reduce the data size of the data to be compressed. In the case of image data, even if some information is lost as a result of this type of irreversible compression, it is usually not noticeable to the human eye.

The n×n quantization data obtained using this processing is input to an entropy encoder 16. The entropy encoder 16 performs encoding for the quantization data by referring to a coding table 18 (for example a Huffman table). This encoding processing can basically be any processing as long as it is entropy encoding processing using a coding table. For example, in the case of JPEG compression, Huffman encoding processing can be used as the entropy encoding. Also, using the entropy encoder 16 it is possible to divide the quantization data into a plurality of types, and to perform different entropy encoding processing for each time. For example, in the case of JPEG, different entropy encoding processing is carried out for dc components and ac components of the quantization data.

The coding table 18 is a table showing correspondence relationships between values of the quantization data and code words, and is set before encoding processing. It is possible to apply a single table to all of the data, but it is also possible to prepare a table for each type of data according to the nature of the type. For example, in the case of JPEG, respective coding tables 18 are prepared for a d.c. component and for an a.c. component.

The entropy encoder 16 obtains code words corresponding to values of the quantization data from this coding table 18, and outputs these code words as an encoded result. This encoding processing is carried out for each item of quantization data including one n×n block.

Block compressed data is obtained using the above described quantization and entropy encoding. This processing is repeated for all blocks of the data to be compressed.

In parallel with the quantization and entropy encoding, encryption processing for the quantization table and the coding table is carried out by the encryptor 20. Obviously this encryption can be encryption of the tables themselves, but it is also possible to encrypt information necessary to reconstruct the table. For example, in the case of a JPEG encryption table, as is well known, if a table showing number of code words for each code length and coding elements arranged in order of frequency of occurrence is known, it is possible to reconstruct the coding table at the decoding side, which means that the same results can be obtained as encrypting the coding tables themselves, even if the table of number of code words and data of coding elements for order of frequency of occurrence are encrypted.

An encryption method used in the encryptor 20 can be any currently known standard encryption method as long as encryption strength is sufficiently strong. For example, it is also possible to use a public key encryption method, and to use an encryption method that is a combination of shared key encryption and public key encryption.

A multiplexor 24 joins compressed data output from the entropy encoder 16, encrypted data such as the quantization table output from the encryptor 20 and various parameters 22 required to interpret the decoded data, into one, to collect them together as single multiplexed data. In the case of JPEG, a single JPEG file is completed using this multiplexing processing. Here, if the data to be compressed is image data, information required to output and display the image data obtained through decoding as image information, such as, for example, overall number of pixels of the image data, number of pixels on one line, block size, data precision, number of components etc. are included in the parameters 22. Also, information required to isolate and retrieve encrypted data and compressed data from within the multiplexed data is included in a set of this parameter group. Encrypted data size and position of encrypted data within the multiplexed data (for example, which number data segment is encrypted data) can be given as examples of this type of information. In this case, it is possible to obtain encrypted data size information from the encryptor 20, and to obtain position of the encrypted data from the multiplexor 24.

For example, generally speaking, JFIF, which is one file format of the JPEG standard, has a quantization table 14, a coding table 18 and respective fields of compressed data arranged in that order, and information on the data size (namely data length) of those fields is included in each field. With this embodiment on the other hand, if fields of the quantization table 14 and the coding table 18 are encrypted, it becomes impossible to see data length information for these fields at the decoding side, which means that it becomes impossible to ascertain where the encrypted data is destined for and from where the fields of compressed data start. With this embodiment, as described above, by including data necessary to divide up and extract encrypted data and compressed data from within the multiplexed data in the parameters 22, it becomes possible to extract encrypted data and compressed data at the decoding side. When applying the method of this embodiment to JPEG compression, the field length of the parameters 22 is known from the description of the JPEG standard format, which means that if the data size of the encrypted data is known, it will be possible to obtain the first position of the compressed data, and it will be possible to extract parameters 22, encrypted data and compressed data from the multiplexed file. It is therefore preferable to incorporate the size of the encrypted data in the parameters 22.

A compression/encryption device of this embodiment has been described above. This device encrypts only a quantization table 14 and a coding table 18, and in the case of JPEG compression both of these tables are small amounts of data of less than 400 bytes, which is extremely small compared to the data to be compressed. Also, even if the data size of the data to be compressed is large, the size of the respective tables does not vary. Accordingly, CPU capability and time required for encryption processing of the quantization table 14 and the coding table 18 are extremely low. For example, in the case of JPEG compression of an image, according to the technique of this embodiment if the data size is 1 Mbyte of image data, encryptions processing amount can be reduced to approximately $\frac{1}{2,000}$, and with 10 Mbytes of data it can be reduced to about $\frac{1}{20,000}$.

If there is no quantization table 14 or coding table 18 it is not possible to correctly decode the compressed data, which means that even if there is leakage of multiplexed data, as long as the tables are encrypted, it will be possible to conceal the data to be compressed.

In this way, according to the compression/encryption device of this embodiment, it becomes possible to compress and encrypt data with a reduced CPU load or reduced time compared to the related art.

Figure 2:
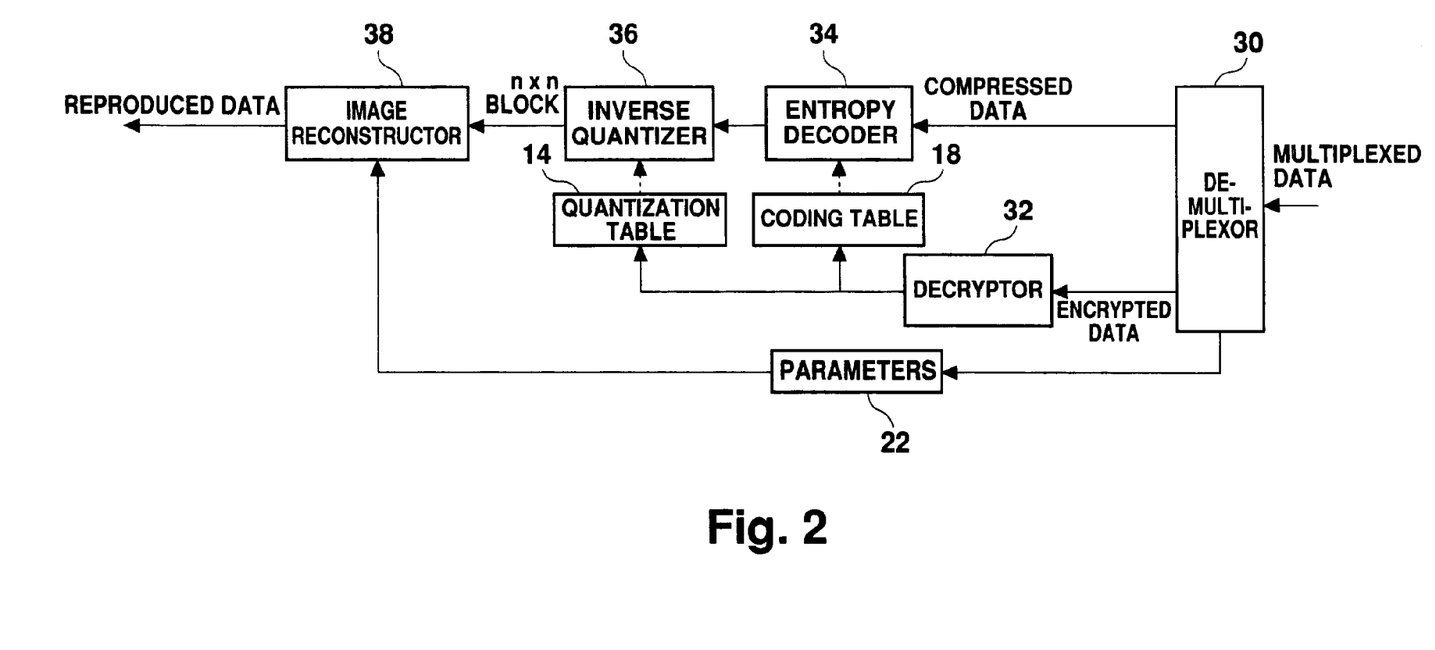
FIG. 2 is a functional block diagram showing the structure of a decompression/decryption device of the present invention.

One example of the structure of a decompression/decryption device for decompressing and decrypting the multiplexed data generated by the compression/encryption device is shown in FIG. 2.

In the decompression/decryption device, a demultiplexor 30 separates input multiplexed data into parameters 22 required in order to interpret a decoded result, compressed data resulting from compression encoding of the data to be compressed, and encrypted data resulting from encryption of the quantization table 14 and the coding table 18. The parameters 22 are contained in a header portion of multiplexed data, and so can be extracted from this header portion. Since information representing size and position of the encrypted data is included in the extracted parameters 22, the demultiplexor 30 can extract encrypted data from the multiplexed data based on this parameter. What remains after removal of the parameters 22 and the encrypted data from the multiplexed data is compressed data.

A decryptor 32 decodes extracted encrypted data and restores the quantization table 14 and the coding table 18. If the tables themselves are encrypted, it is possible to restore the tables simply by decoding. On the other hand, if the encrypted data has encrypted information necessary to reconstruct the tables, then the decryptor 32 generates a coding table etc. based on decoding results for the encrypted data.

An entropy decoder 34 references the restored coding table 18 to perform entropy decoding of the compressed data one block at a time. This decoding processing can be processing that is a reverse process of the encoding process, and can use a well known decoding process.

An inverse quantizer 36 carries out reverse quantization for block data that has been entropy decoded using the restored quantization table 14. This reverse quantization processing can also use a well known process.

By processing one block of compressed data with the entropy encoder 34 and the reverse quantizer 36, one block of original data is reproduced. An image reconstructer 38 reproduces original data by reconstructing each block of reproduced data with reference to the parameters 22.

A compression/encryption device and corresponding decompression/decryption device of this embodiment have been described above. With the device used in the above example, both the quantization table 14 and the coding table 18 are encrypted, but it also possible to have a configuration where one of them is encrypted, and similar effects can be obtained.

Figure 3:
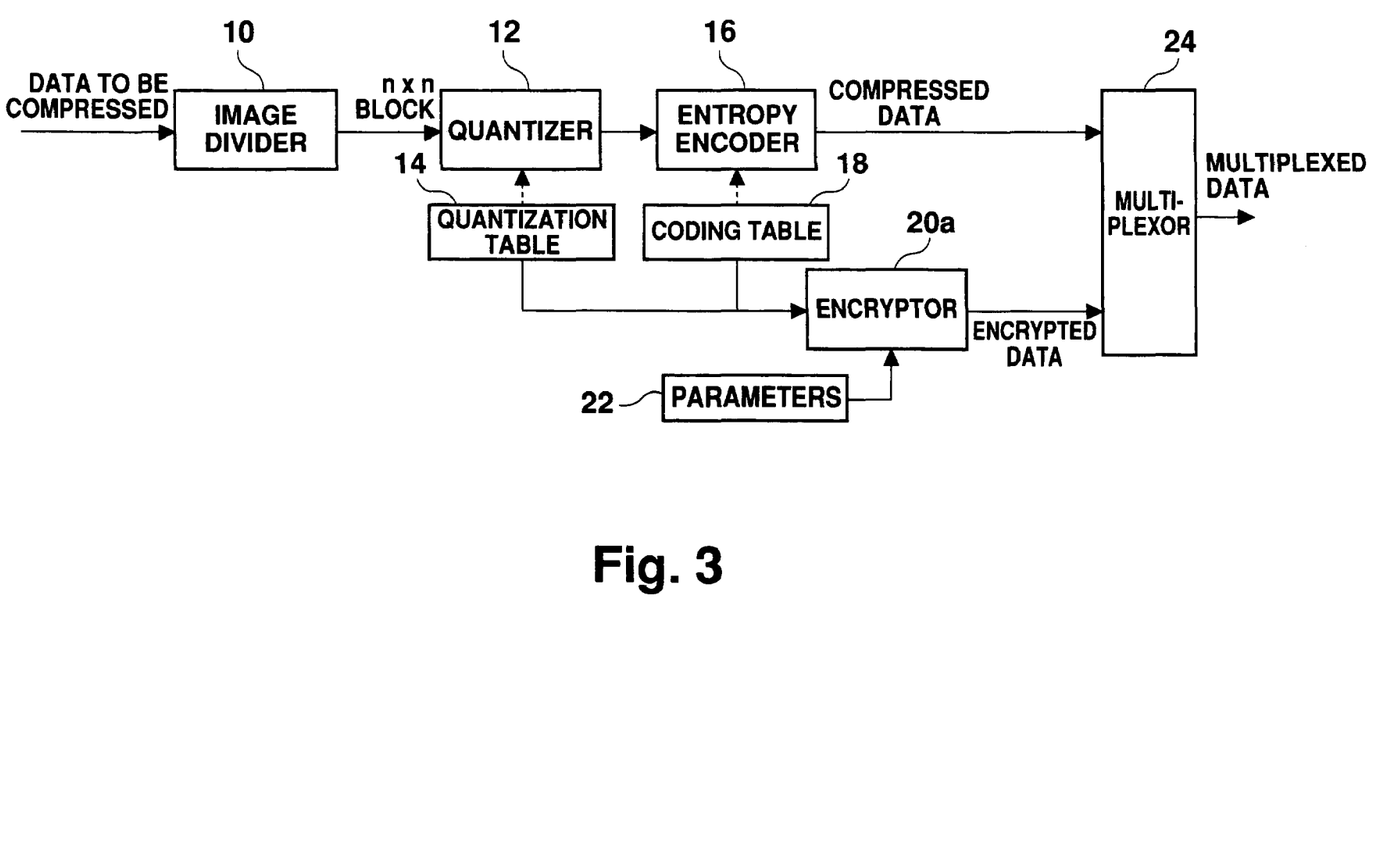
FIG. 3 is a functional block diagram showing a modified example of a compression/encryption device of the present invention.

A first modified example of a compression/encryption device of the embodiment described above will now be described with reference to FIG. 3. In FIG. 3, structural elements that are the same or similar to the structural elements of the device shown in FIG. 1 have the same reference numerals, and description of these parts will be omitted.

As shown in FIG. 3, with this first modified example, an encryptor 20*a* also encrypts the parameters 22 required for interpreting the decoded data, in addition to the quantization table 14 and the coding table 18. In this way, the parameters 22 are also concealed, which means that it is possible to increase the encryption strength.

However, with this modified example, necessary information (for example, data size of the encrypted data) to extract encrypted data and compressed data separately from the multiplexed data, is passed to the decoding side without being encrypted. Conversely, with this modified example, all or some of the items of the parameters 22 besides this information can be encrypted.

A decompression/decryption device (not shown) corresponding to the first modified example can be similar to the structure of the device shown in FIG. 2, apart from the fact that the parameters 22 are extracted from the decoding result of the decryptor 32.

Figure 4:
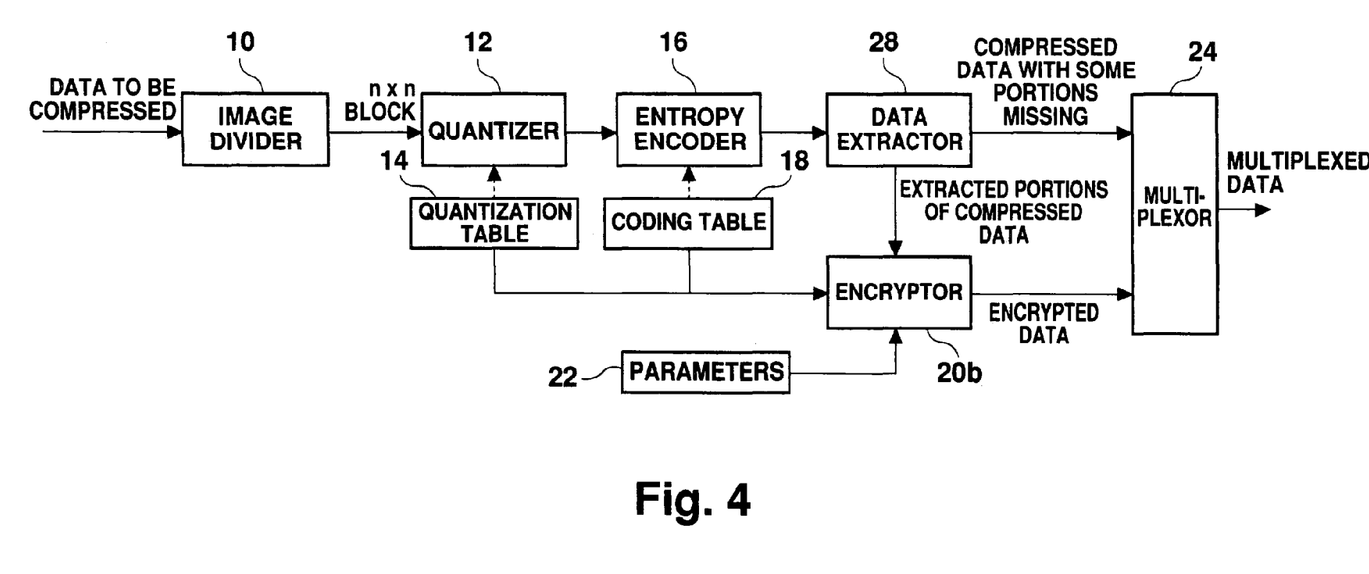
FIG. 4 is a functional block diagram showing another modified example of a compression/encryption device of the present invention.

Next, a second modified example will be described with reference to FIG. 4 and FIG. 5. FIG. 4 is a drawing showing the structure of a compression/encryption device of this modified example. In FIG. 4, structural elements that are the same or similar to the structural elements of the device shown in FIG. 1 have the same reference numerals, and description of these parts will be omitted.

In addition to the structure of the embodiment of FIG. 1, the compression/encryption device of this second modified example is also provided with a data extractor 28 for extracting part of the compressed data output from the entropy encoder 16. The data extractor 28 removes that part from the compressed data and inputs the extracted part to a multiplexor 24 at a subsequent stage. Also, an encryptor 20*b* encrypts the parameters 22 and part of the compressed data extracted by the data extractor 28, as well as the quantization table 14 and the coding table 18, and generates encrypted data. The multiplexor 24 then multiplexes this encrypted data and compressed data that has a part missing. However, with this modified example also, only necessary information for discerning and extracting encrypted data and compressed data from the multiplexed data (for example, data size of the encrypted data) is included in the multiplexed data without being encrypted.

According to this modified example, since part of the encrypted data is concealed, it is possible to improve the encryption strength. For example, even if an attacker extracted only compressed data from the multiplexed data and was able to decode by analyzing patterns in this compressed data, there are missing parts in the compressed data, and also, it is not possible to know where those missing parts are, so this type of analysis is extremely difficult.

With this modified example, even if the data size of the portions that are missing from the compressed data does not vary according to the data size of the data to be compressed, the above described effect of improving encryption strength can be obtained.

Also, with this modified example, it is possible to have the position and size of the portions that are missing from the compressed data vary for each item of data to be compressed. In this way, it is possible to further increase the encryption strength. This can be done by, for example, having a control section (not shown) for controlling overall compression and encryption processing generate a random number when commencing compression and encryption processing for the data to be compressed, determining the position and size of the missing portions in accordance with this random number, and indicating these missing portions to the data extraction section 28. At this time, information about the position and size of the missing portions is encrypted as one of the parameters and inserted into the encrypted data.

It is also effective to have a method where only one of the position or size of the missing portions is varied.

Also, in this modified example, it is obviously also possible to cause deletion of respective data from a plurality of places that are separated from each other within the compressed data.

Figure 5:
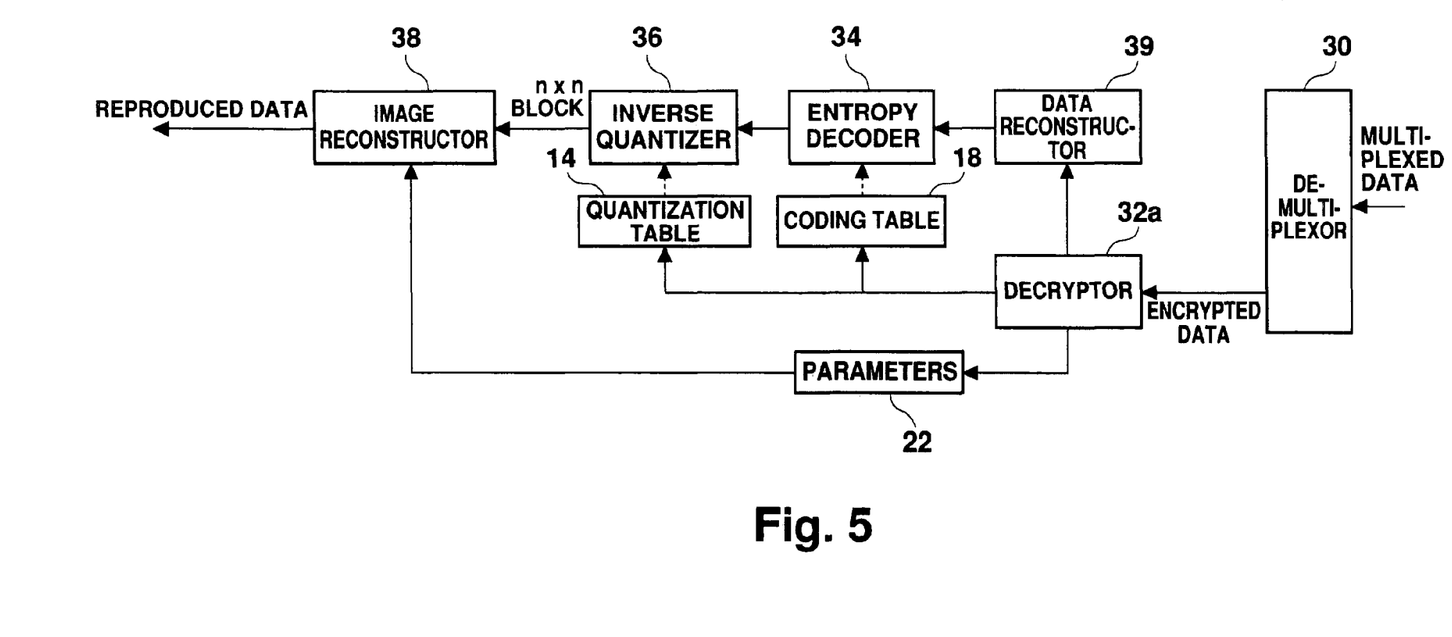
FIG. 5 is a functional block diagram showing a modified example of a decompression/decryption device of the present invention.

An example of the structure of a decompression/decryption device corresponding to the compression/encryption device of FIG. 4 is shown in FIG. 5. In FIG. 5, structural elements that are the same or similar to the structural elements of the device shown in FIG. 2 have the same reference numerals, and description of these parts will be omitted.

With the decompression/decryption device of FIG. 5, a decryptor 32a decrypts encrypted data within the multiplexed data, and obtains quantization table 14, coding table 18, parameters 22 and data portions that have been removed from the compressed data. A data reconstructor 39 combines the data of the missing portions with compressed data (having missing parts) output from the demultiplexor 30, to restore the original compressed data. At this time, the data reconstructor 39 restores compressed data by incorporating the missing portions of data into appropriate positions of the compressed data with deleted portions based on information about the position and size of missing portions included in the parameters decrypted by the decryptor 32a. After restoring the compressed data, it is preferable to carry out the same processing as for the device of FIG. 2.

With the second modified example, the encryptor 20b encrypted the quantization table 14, the coding table 18, the parameters 22 and data portions that had been removed from the compressed data, but it is also possible to have a configuration with at least one of the quantization table 14 and the coding table 18, with data portions that have been removed from the compressed data being encrypted.

Figure 6:
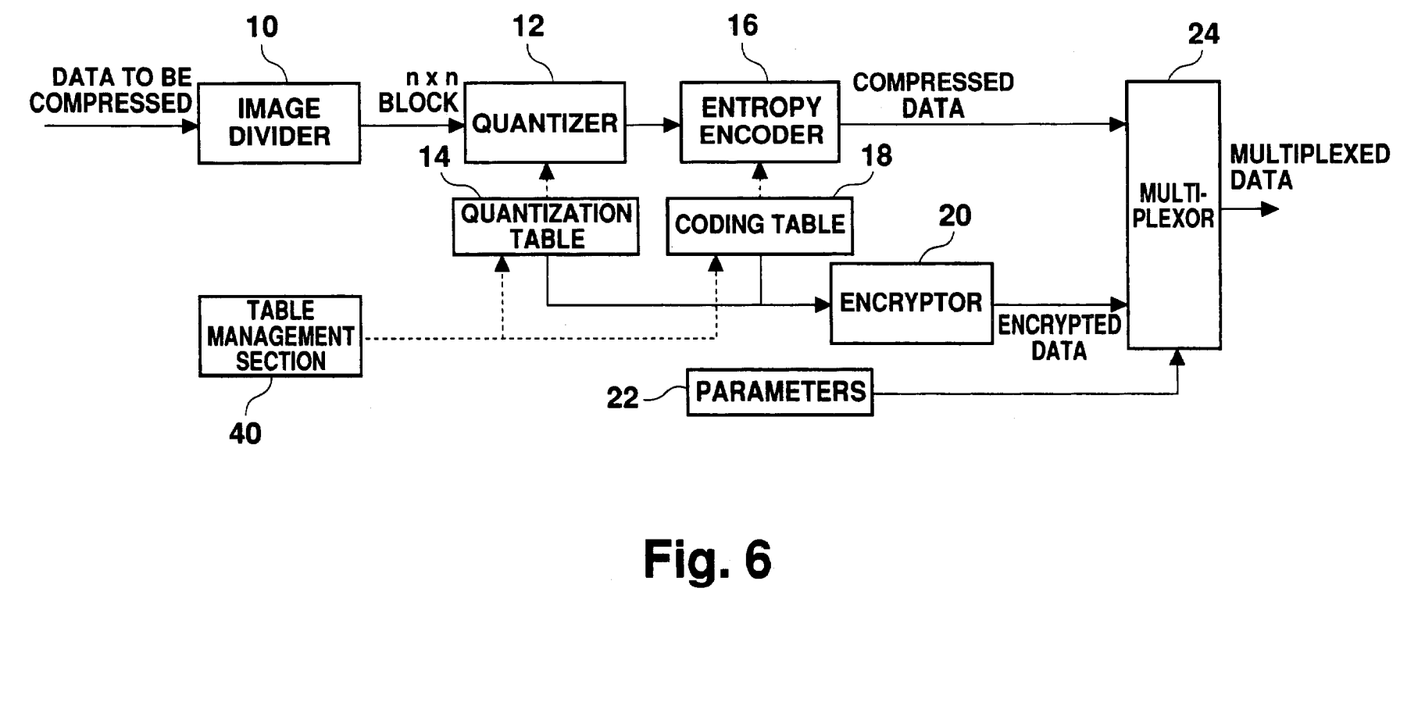
FIG. 6 is a functional block diagram showing a further modified example of a compression/encryption device of the present invention.

Next, a third modified example will be described with reference to FIG. 6. FIG. 6 is a drawing showing the structure of a compression/encryption device of this modified example. In FIG. 6, structural elements that are the same or similar to the structural elements of the device shown in FIG. 1 have the same reference numerals, and description of these parts will be omitted.

In addition to the structure of the device of FIG. 1, this third modified example is further provided with a table management section 40. The table management section 40 has a function of changing the content of at least one of the quantization table 14 and the coding table 18.

With a digital still camera, for example, a basic quantization table is provided, and it is standard practice to create a quantization table to be referenced when carrying out compression processing by dividing values for each quantization threshold of this basic table by a Q value (quality factor) corresponding to a user's compression rate instruction. Also, this type of basic table is provided individually for each scene of image data to be compressed, and using a basic table corresponding to a scene is well known. However, in any case there are not many types of quantization table used by a camera in compression.

Accordingly, even if encrypted data can not be decrypted, if all candidate quantization tables having high possibility of being used, for example, are applied, there is also a possibility of favorable decoding results being obtained.

In contrast to this, with this third embodiment, by changing values of some or all of the quantization thresholds in a quantization table created based on a compression ratio instruction or scene properties using the table management section 40, it is possible to widen the range of a quantization table used, and it is possible to decrease the success rate of all candidates applying attacks.

Since changing thresholds in the quantization table in an increasing direction invites image quality degradation, with a structure that desires to avoid image quality degradation, it is necessary to change the thresholds in a decreasing direction. In this case, data compression rate is degraded but safety of encryption is improved.

Also, when the table management section 40 is changing a quantization table, which or how many entries in the table are changed, are determined randomly, it is preferable for there to be a lot of variation of the quantization table used. Also, each time there is a change amount or change proportion for a threshold, it is preferable to randomly change the amount or proportion.

Change processing for the quantization table using the table management section 40 is preferably carried out at a timing determined according to a specified rule, such as each time compression and encryption processing is carried out, or each time compression and encryption processing is carried out a predetermined number.

In the above description, an example has been given of dynamically changing the content of a quantization table 14 using the table management section 40, but in a similar method it is also possible to dynamically change the coding table 18.

Figure 7:
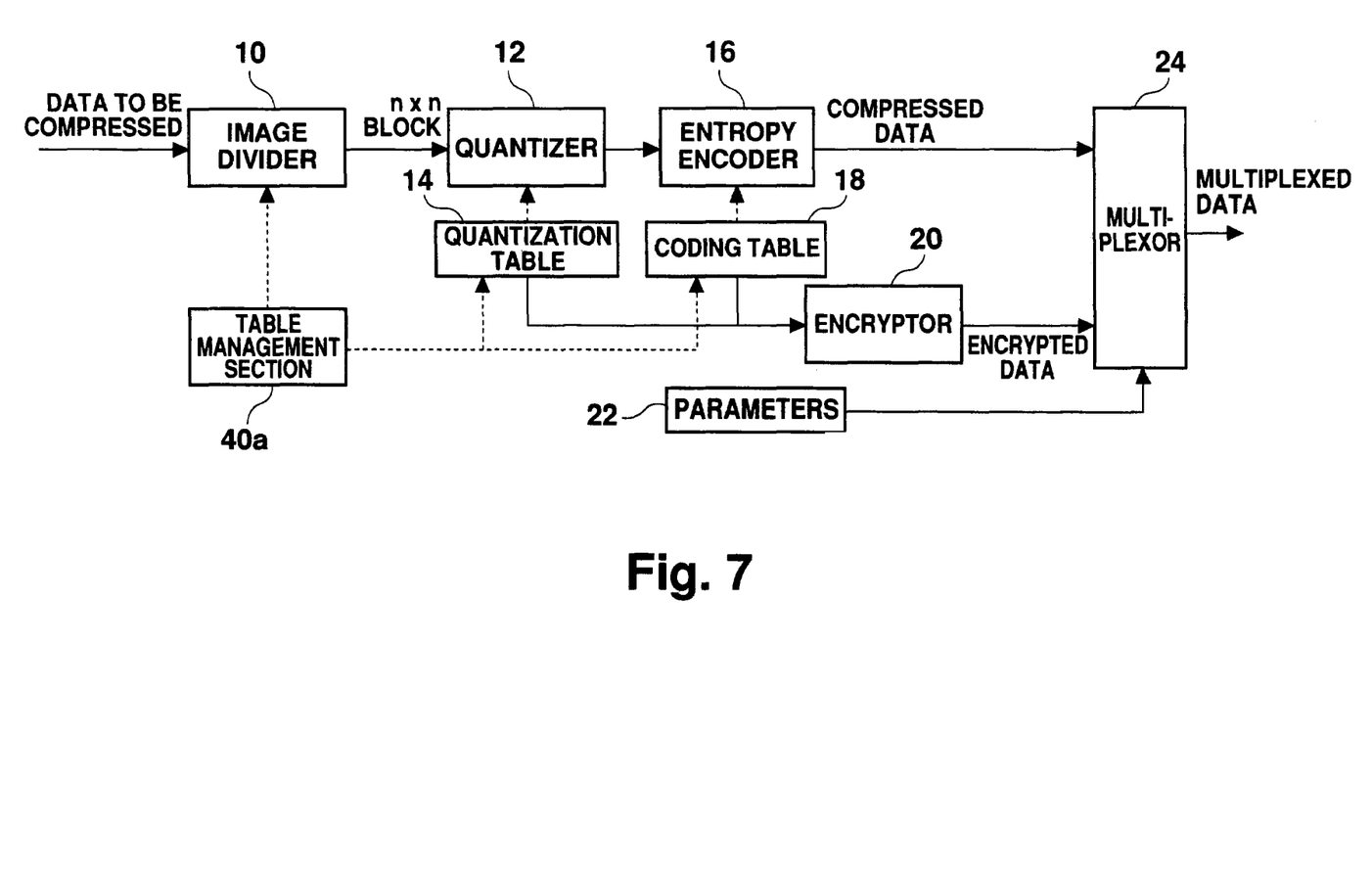
FIG. 7 is a functional block diagram showing a further modified example of a compression/encryption device of the present invention.

Next, a fourth modified example will be described with reference to FIG. 7. FIG. 7 is a drawing showing the structure of a compression/encryption device of this modified example. In FIG. 7, structural elements that are the same or similar to the structural elements of the device shown in FIG. 1 have the same reference numerals, and description of these parts will be omitted.

In addition to the device of FIG. 1, the compression/encryption device of this fourth modified example is further provided with a table management section 40a. This table management section 40a is equipped with a function of changing the table size of at least one of the quantization table 14 or the coding table 18.

Here, the table size is the number of table entries (items). For example, in the quantization table 14 there are n×n entries corresponding to a block size for data to be compressed of the image divider 10, namely, "n×n". Specifically, the size of the quantization table 14 is determined using a value of n. Similarly, in the case of the coding table, the table size is determined using range of codeword lengths used or a number of code words used for each word length.

Also, change of table size can be realized by respectively preparing tables of each size in advance, and selecting a table to be used from among these tables. For example, if the size of the quantization table 14 is changed, in conditions of a table for an 8×8 block, a table for a 9×9 block, a table for a 10×10 block . . . , it is simply necessary to prepare one or a plurality of quantization tables for each table size. "table size change" is then realized by selecting a table used in compression processing from among the plurality of prepared tables each time a table is updated based on a specified rule. Changing the size of a coding table can also be carried out in a similar manner by preparing a plurality of coding tables of differing size in advance and dynamically determining the one to be used from among the plurality of tables.

The timing for table change can be automatically determined based on a specified rule, such as each time compression processing is carried out for data to be compressed, or every time the compression processing is carried out a specified number of times.

The table management section 40a determines the size of the quantization table 14 and coding table 18 at this table change timing in accordance with random or specified size change rules. A table of that size is then selected from among tables of each size being held, and provided to the quantizer 12 and the entropy encoder 16. The table management section 40a also provides table size of the quantization table 14, namely a value of n, to the image divider 10. The image divider 10 sets block size in response to this value of n, and divides data to be compressed into blocks of n×n pixels. Here, information representing the table size of the quantization table 14 and the coding table 18 can be incorporated in the multiplexed data as part of the parameters 22, as required. In this way, it is possible to correctly restore these tables at the decoding side. As well as encrypting this table size information, if it is incorporated into the multiplexed data it is possible to improve safety in the event of data leakage.

The example given here is for the case of changing the size of both the quantization table 14 and the coding table 18, but it is also effective to have a structure where the size of only one is changed. It is also possible, in addition to changing the table size, to dynamically change some or all entry values in a selected table, similarly to the modified example 3. In this way, it is possible to further improve encryption strength.

According to the compression/encryption device of the fourth modified example, since the table size of at least one among the quantization table 14 and the coding table 18 is dynamically changed, it is difficult for an attacker to estimate the table. Encryption strength is therefore improved.

A decompression/decryption device corresponding to the compression/encryption device of the fourth modified example can have a structure where block size for image reconstruction is set to match the table size of the quantization table 14 that has been restored by decoding.

As has been described above, according to the present invention, even if there are constraints such as CPU capability or amount of memory due to price or portability, since the amount of processing (or processing time) required for encryption is reduced, it is possible to realize a secure and practical service.

Each of the compression/encryption devices and decompression/decryption devices described above can be realized as software, which can be stored in a computer readable storage medium such as a memory, and it is also possible to have some or all of the sections as hardware circuits.

Examples of image data compression have been given above, but the technique of the present invention can be applied to various types of data, such as moving picture data and text data. Besides JPEG compression, the technique of the present invention can also be applied to various compression methods that use conversion tables such as coding tables for compression processing, such as MPEG compression and Huffman encoding.

What is claimed is:

1. A device for compressing and encrypting data, comprising:
    a compressor for compressing original data with reference to a reference table;
    an encryptor for encrypting the reference table itself or information necessary to reconstruct the reference table; and
    a multiplexor for multiplexing compressed data obtained from the compressor and encrypted data obtained from the encryptor to create multiplexed data, wherein the multiplexed data is output as an encryption result.

2. The device of claim 1, wherein the reference table is a quantization table determining quantization step size when quantizing values of respective frequency components of the original data.

3. The device of claim 1, wherein the reference table is a coding table determining a relationship between data values and code words when performing entropy encoding of data.

4. The device of claim 1, wherein the encryptor encrypts parameters necessary for interpreting data acquired from decompression of the compressed data.

5. The device of claim 4, further provided with a data extractor for extracting partial data from the compressed data, and wherein the encryptor further encrypts partial data extracted from the compressed data by the data extractor, and the multiplexor multiplexes data remaining having the partial data removed from the compressed data with the encryption result from the encryptor to generate multiplexed data.

6. The device of claim 1, further provided with a reference table changer for changing at least one table entry value in the reference table depending on at least one of the nature of the original data or compression conditions of the data compression, wherein the compressor performs data compression using the reference table that has been changed by the reference table changer.

7. The device of claim 1, further provided with a reference table changer for changing table size of the reference table, wherein the compressor performs data compression using the reference table that has been changed in size by the reference table changer.

8. A device for reproducing original data by decompressing and decrypting data that has been compressed and encrypted, comprising:
    a demultiplexor for extracting compressed data which is a compressed result obtained by compressing the original data, and encrypted data which is an encrypted result obtained by encrypting a reference table to be referenced when performing data compression of the compressed data, from input multiplexed data;
    a decoder for obtaining the reference table by decoding the encrypted data; and
    a decompressor for referencing the reference table to decompress the compressed data, wherein decompressed data from the decompressor is output as a decoded result.

9. The device of claim 8, wherein the reference table is a quantization table determining a quantization step size when carrying out quantization of values of respective frequency components of the original data.

10. The device of claim 8, wherein the reference table is a coding table determining a relationship between data values and code words when performing entropy encoding of data.

11. The device of claim 8, wherein partial data necessary to restore the original data is removed from the compressed data, the encrypted data is the reference table and partial data that has been removed from the compressed data encrypted, the decoder obtains the reference table and the partial data by decoding the encrypted data, and the decompressor complements the compressed data using the partial data obtained by the decoder and carries out decompression of the complemented result by referencing the reference table.

12. A method of compressing and encrypting data, comprising step of:
   compressing original data with reference to a reference table;
   encrypting the reference table itself or information necessary to reconstruct the reference table; and
   multiplexing compressed data acquired through the step of compressing original data and encrypted data acquired through the step of encrypting the information to create and output multiplexed data.

13. A method of decompressing and decrypting data that has been compressed and encrypted, comprising steps of:
   extracting compressed data and encrypted data from input multiplexed data;
   restoring a reference table to be referenced when carrying out data decompression by decoding the encrypted data; and
   referencing the reference table to decompress the decompressed data and outputting the decompressed result.

14. A computer readable storage medium storing a program for causing a computer to execute steps of:
   compressing original data with reference to a reference table;
   encrypting the reference table itself or information necessary to reconstruct the reference table; and
   multiplexing compressed data acquired through the step of compressing original data and encrypted data acquired through the step of encrypting the information to create and output multiplexed data.

15. A computer readable storage medium storing a program for causing a computer to execute steps of:
   extracting compressed data and encrypted data from input multiplexed data;
   restoring a reference table to be referenced when carrying out data decompression by decoding the encrypted data; and
   referencing the reference table to decompress the decompressed data and outputting the decompressed result.

* * * * *